US008797944B2

(12) United States Patent
Choi et al.

(10) Patent No.: US 8,797,944 B2
(45) Date of Patent: Aug. 5, 2014

(54) MOBILITY MANAGEMENT SYSTEM AND METHOD FOR INTERNET PROTOCOL BASED LOW POWER WIRELESS NETWORK

(75) Inventors: Hyo Hyun Choi, Seoul (KR); Sun Gi Kim, Seoul (KR); Tae Shik Shon, Suwon-si (KR); Jin Ho Kim, Goyang-si (KR); Choong Seon Hong, Yongin-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 903 days.

(21) Appl. No.: 12/354,875

(22) Filed: Jan. 16, 2009

(65) Prior Publication Data

US 2009/0185538 A1 Jul. 23, 2009

(30) Foreign Application Priority Data

Jan. 18, 2008 (KR) .............................. 2008-0005530

(51) Int. Cl.
*H04W 4/00* (2009.01)
(52) U.S. Cl.
USPC .......................................... 370/328; 370/331
(58) Field of Classification Search
CPC ............. H04W 36/00–36/0077; H04W 84/18; H04W 84/20; H04W 8/08–8/014
USPC .......................... 370/310–350; 455/436–444
See application file for complete search history.

(56) References Cited

U.S. PATENT DOCUMENTS

| | | | |
|---|---|---|---|
| 7,103,386 B2 * | 9/2006 | Hoffmann et al. | 455/562.1 |
| 2004/0203596 A1 * | 10/2004 | Sreemanthula et al. | 455/411 |
| 2004/0203787 A1 * | 10/2004 | Naghian | 455/437 |
| 2005/0099971 A1 * | 5/2005 | Droms et al. | 370/328 |
| 2006/0050628 A1 * | 3/2006 | Ng et al. | 370/216 |
| 2006/0240825 A1 * | 10/2006 | Funabiki et al. | 455/436 |
| 2006/0291426 A1 * | 12/2006 | Park et al. | 370/331 |
| 2007/0008906 A1 * | 1/2007 | Han et al. | 370/254 |

OTHER PUBLICATIONS

Narten et al, "Neighbor Discovery in IPv6", Sep. 2007, RFC 4861, pp. 29-30.*
Johnson, et al. , " Mobility Support in IPv6", Jun. 2004, RFC 3775, pp. 5,6,11-14, 61-64, 122,123.*
Montenegro et al, "Transmission of IPv6 Packets over IEEE 802.15.4 Networks", Feb. 2005, pp. 1-16.*

* cited by examiner

*Primary Examiner* — Andrew Chriss
*Assistant Examiner* — Kenan Cehic
(74) *Attorney, Agent, or Firm* — Cha & Reiter, LLC

(57) ABSTRACT

A mobility management system and method is provided for efficiently support mobility to an IPv6 based LoWpan. The mobility management method for Internet Protocol version 6 (IPv6) based personal area network (PAN) moving with a mobile router according to the present invention includes detecting, at a mobile terminal, movement of the mobile router; determining whether the movement is an intra-network movement or an inter-network movement, transmitting, when the movement is an intra-network movement, a neighbor discovery request message to a gateway of a currently attached network and receiving a neighbor discovery response message containing a temporary address transmitted by the gateway in response to the neighbor discovery request message. When the movement is an inter-network movement, the gateway receives the binding acknowledgement message from a home agent and establishes a bidirectional tunnel with the home agent.

15 Claims, 9 Drawing Sheets

MOBILITY MANAGEMENT SYSTEM AND METHOD FOR INTERNET PROTOCOL BASED LOW POWER WIRELESS NETWORK

CLAIM OF PRIORITY

This application claims the benefit of the earlier filing date, pursuant to 35 USC 119, to that patent application entitled "MOBILITY MANAGEMENT SYSTEM AND METHOD FOR INTERNET PROTOCOL BASED LOW POWER WIRELESS NETWORK" filed in the Korean Intellectual Property Office on Jan. 18, 2008 and assigned Serial No. 2008-0005530, the contents of which are incorporated herein by reference.

BACKGROUND OF THE INVENTION

1. Field of the Invention

The present invention relates to an Internet Protocol Version 6 (IPv6) based Low Power Wireless Personal Area Network (LoWPAN) and, in particular, to a mobility management system and method for a LoWPAN.

2. Description of the Related Art

Unlike the IP-based Local Area Network (LAN) and Wide Area Network (WAN), a Personal Area Network (PAN) is a simple low cost communication network that allows wireless connectivity in application with limited power and relaxed throughput requirements. An Internet Protocol V6 (IPv6) based Low Power Wireless Personal Area Network (referred to herein as 6LoWPAN) is a wireless communication network implemented with connectivity to IP network by adding a gateway to the LoWPAN, and many researches and standardization efforts for efficient packet transmission over 6LoWPAN have been done.

Meanwhile, recent communication systems are designed such that end devices maintain their connections to the system while moving among networks, or routers. Particularly with respect to the 6LoWPAN, there have been various Network Mobility (NEMO) techniques proposed for a mobile router to support the mobility of the nodes in a 6LoWPAN. With a NEMO, the mobile router enables a node to access the Internet via a wireless access network such as Wireless Local Area Network (WLAN), which may be based on the Institute of Electrical and Electronics Engineers (IEEE) 802.11 standard.

FIG. 1 is a schematic diagram illustrating a conventional network architecture including a 6LoWPAN node showing access to an IP network from the 6LoWPAN.

In FIG. 1, nodes of 6LoWPANs 101, 103, which represent typical of 6LoWPANs, access an conventional IPv6 network via access networks 102 and 104, respectively, connected by means of mobile routers 110 and 112 located in respective 6LoWPANs 101 and 103. As shown in FIG. 1, the mobile router 110 operates in WLAN mode to connect to an access point (AP) 120 defining a WLAN 102, and, with respect to 6LoWPAN 103, the mobile router 112 operates in ad hoc mode to connect to a mobile router 141 or 142 defining a mobile ad hoc network (MANET) 104. The AP 120 is connected to the Access Router 130 of the IPv6 network, and the mobile routers 141 and 142 of the MANET are connected to the Access Router 132 of the IPv6 network via a gateway 140. The access network connection mode of the mobile routers 110 and 112 of 6LoWPANs 101 and 103, respectively, determines their egress interface. That is, when the egress interface of a mobile router is configured to an IEEE 802.11 WLAN mode, the mobile router establishes a connection to an AP of an IEEE 802.11 WLAN, the AP being connected to an access router of the IPv6 network. Otherwise, when the egress interface of a mobile router is configured to an IEEE 802.11 ad hoc mode, the mobile router establishes a connection to a gateway of a MANET via one of the mobile routers constituting the MANET, and the gateway being connected to an access router of the IPv6 network. The mobile routers of the MANET can establish links among each other and connect to the access router of the IPv6 network via the gateway of the MANET without involvement of an AP.

In the network environment having multiple 6LoWPANs, as shown in FIG. 1, a 6LoWPAN may also be connected to another 6LoWPAN, rather than to a WLAN, for accessing the IPv6 network, and this situation causes significant network problems due to the excessive overhead to the nodes inappropriate for accommodating a mobility protocol and limited packet size. Accordingly, there is a need to develop an efficient mobility management technique that is appropriate for 6LoWPAN networks and capable of overcoming these network problems caused by using the conventional mobility protocol.

SUMMARY OF THE INVENTION

In order to overcome the above problems of the prior art, the present invention provides a mobility management system and method that is capable of supporting mobility in 6LoWPAN environment.

The present invention provides a mobility management system and method that is capable of supporting intra-network mobility and inter-network in unit of network in a multiple 6LoWPAN environment.

In accordance with an exemplary embodiment of the present invention, a mobility management method for Internet Protocol version 6 (IPv6) based personal area network (PAN) moving with a mobile router includes detecting, at the mobile terminal, movement of the mobile router, determining whether the movement is an intra-network movement or an inter-network movement, transmitting, when the movement is an intra-network movement, a neighbor discovery request message to a gateway of a currently attached network and receiving a neighbor discovery response message containing a temporary address transmitted by the gateway in response to the neighbor discovery request message.

Preferably, the mobility management method further includes transmitting, when the movement is an inter-network movement, a binding update message of which source address is set to the temporary address to the gateway after receiving the neighbor discover response message, resetting, at the gateway, the source address of the binding update message to an address of the gateway, transmitting the binding update message having the reset source address from the gateway to a home agent, transmitting a binding acknowledgement message from the home agent to the gateway in response to the binding update message, and forwarding, at the gateway, the binding acknowledgement message to the mobile router.

In accordance with another exemplary embodiment of the present invention, a mobility management system for Internet Protocol version 6 (IPv6) based personal area network (PAN) includes a mobile router which moves with the PAN, detects movement, determines whether the movement is an intra-network movement or an inter-network movement, and transmits, when the movement is an intra-network movement, a neighbor discovery request message to an access PAN which provides access to an external network and a gateway which is a full function device having a routing function and belonged to the access PAN, having a unique network identifier (PAN ID), and transmits a neighbor discovery response message containing a temporary address of the PAN in response to the neighbor discovery request message.

Preferably, the mobility management system further includes a home agent, the mobile router transmits, when the movement is an inter-network movement, a binding update message of which source address is set to the temporary address to the gateway after receiving the neighbor discover response message; the gateway resets the source address of the binding update message to an address of the gateway and transmits the binding update message having the reset source address from the gateway to the home agent and the home agent transmits a binding acknowledgement message to the mobile router via the gateway in response to the binding update message.

BRIEF DESCRIPTION OF THE DRAWINGS

The above and other aspects, features and advantages of certain exemplary embodiments of the present invention will be more apparent from the following description taken in conjunction with the accompanying drawing, in which.

DETAILED DESCRIPTION OF THE INVENTION

Exemplary embodiments of the present invention are described in detail with reference to the accompanying drawings. Although the invention is described in terms of exemplary embodiments, it should be understood that alternative embodiments are obvious to those skilled in the art in view of the disclosure and claims, herein, in order to achieve the purposes of the present invention. Also, it will be apparent to those skilled in the art that various modifications and variations can be made to the present invention without departing from the sprit and scope of the invention. The same reference numbers are used throughout the drawings to refer to the same or like parts. Detailed descriptions of well-known functions and structures incorporated herein may be omitted to avoid obscuring the subject matter of the present invention.

In the following descriptions, the nodes constituting a 6LoWPAN are classified into Full-Function Device (FFD) and Reduced-Function Device (FRD). An FFD can serve as a PAN coordinator, a link coordinator, or just a normal device and has sufficient system resources and computing capability for network routing. When an FFD acts as the gateway of a PAN with an Identifier (ID), it becomes the PAN coordinator. An RFD is implemented with limited memory resources and can be connected to a single FFD at a time. It may cause excessive overhead to use the NEMO protocol with RFDs because of their limited capabilities. Accordingly, it is preferred to use the NEMO protocol only with FFDs. A router is an FFD having a unique PAN ID and supporting the NEMO protocol. The router supports intra-network mobility of the nodes belonging to a 6LoWPAN composed of fixed FFDs and RFDs and a 6LoWPAN composed of mobile FFDs. That is, a mobile FFD belonging to a 6lwpan, having an interface which enables connection to another 6LoWPAN, and using the NEMO protocol can be a mobile router for supporting 6LoW-PAN mobility.

Figure 1:
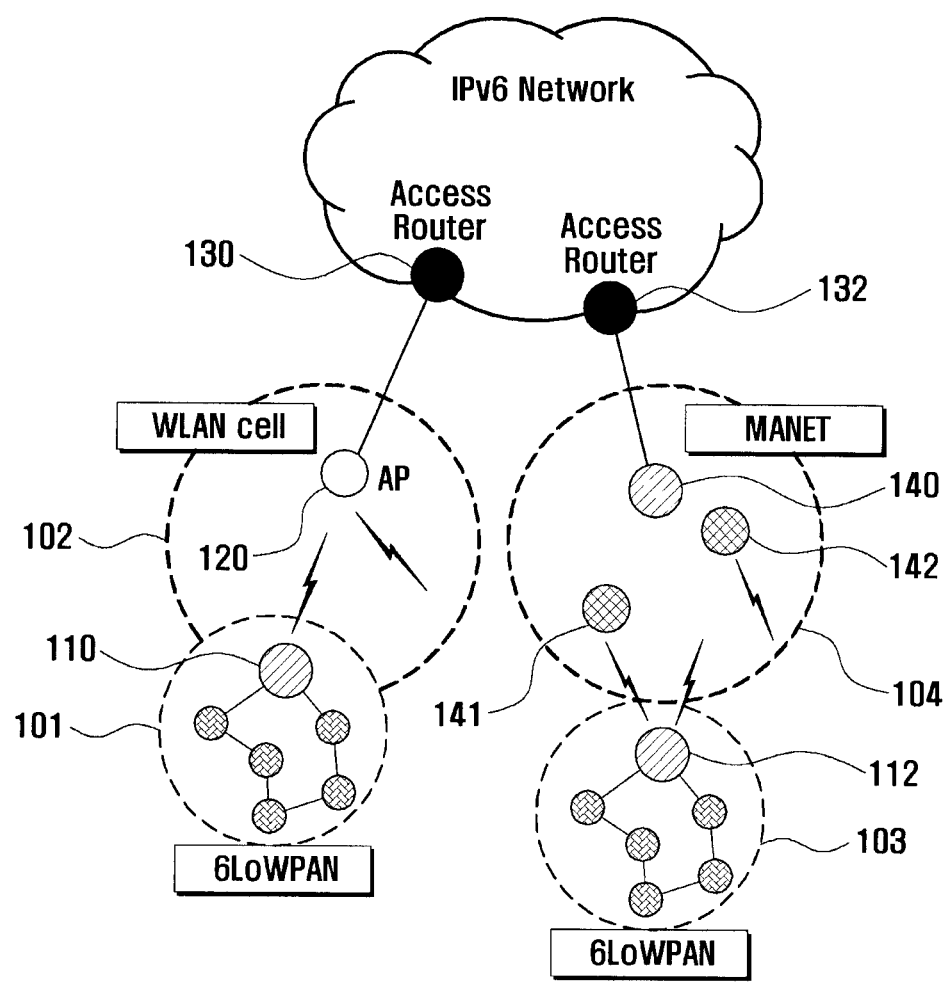
FIG. 1 is a schematic diagram illustrating a conventional network architecture of a 6LoWPAN node accessing an IP network.
Figure 2:
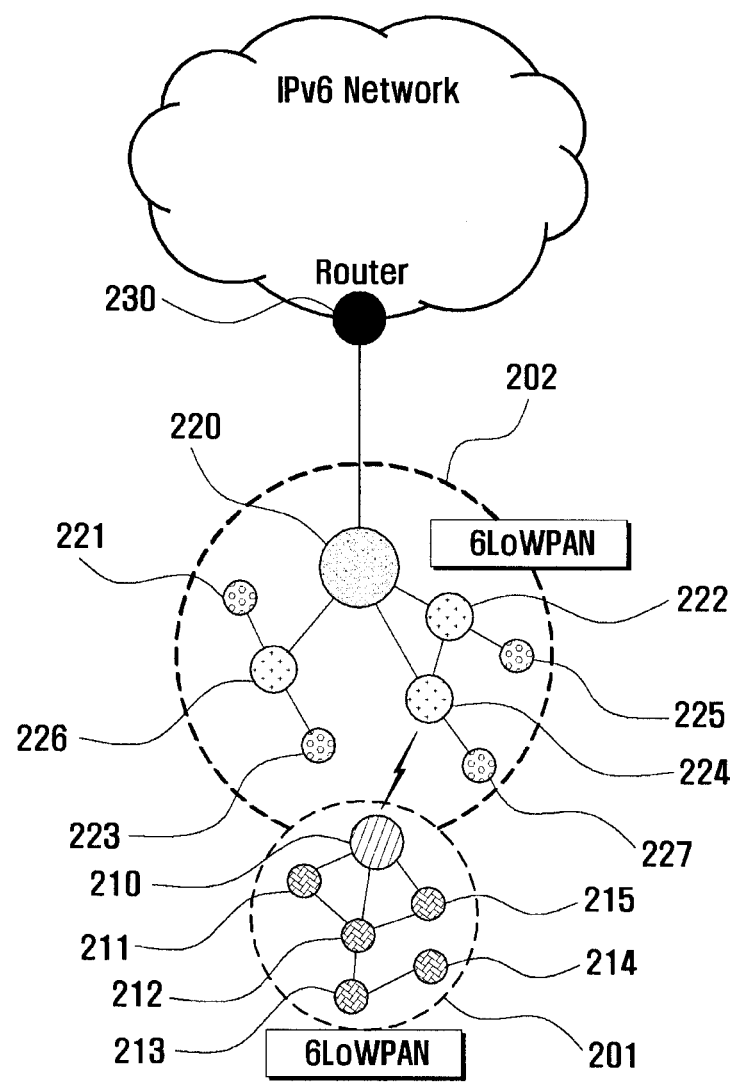
FIG. 2 is a diagram illustrating a scenario in which a 6LoWPAN accesses an IPv6 network via another 6LoWPAN according to an exemplary embodiment of the present invention.

FIG. 2 is a diagram illustrating a scenario in which a 6LoWPAN accesses an IPv6 network via another 6LoWPAN according to an exemplary embodiment of the present invention.

Referring to FIG. 2, the 6LoWPAN 201 (hereinafter called first 6LoWPAN) includes a mobile router 210, which is provided with two IEEE 802.15.4 standard interfaces for supporting mobility to and from another 6LoWPAN 202 (hereinafter called second 6LoWPAN). The mobile router 210 is provided with an egress interface and an ingress interface. The mobile router 210 connects to the second 6LoWPAN 202 by means of the egress interface and provides intra-network mobility to the nodes belonging to the first 6LoWPAN 201. The mobile router 210 can establish a connection to a 6LoW-PAN coordinator 220 of the second 6LoWPAN 202 via any of FFDs 222, 224, and 226 belonging to the second 6LoWPAN 201 so as to access Access Router 230 via the 6LoWPAN coordinator 220.

The mobile router 210 is assigned a 16 bit network-specific address from the 6LoWPAN coordinator 220 whenever it moves into the second 6LoWPAN 202. Here, the 6LoWPAN coordinator 220 acts as a gateway for the 6LoWPAN nodes and routers. The 6LoWPAN mobile router can be a node of a mesh topology formed with connections to other mobile routers using its egress interface. When entering a star topology 6LoWPAN, the mobile router is directly connected to the 6LoWPAN coordinator, however, it is not necessary to be connected to the fixed 6LoWPAN coordinator directly, when it enters a mesh topology 6LoWPAN, but via a neighbor 6LoWPAN FFD. The mobile router can be connected to the 6LoWPAN coordinator via multi hop links, i.e. multiple FFDs in the mesh topology 6LoWPAN. The mesh topology is a network topology in which there is a direct link between all pairs of nodes, and the star topology is a network topology in which all nodes are connected to a centralized hub. Since, in the illustrated embodiment, the second 6LoWPAN 202 is formed in a mesh topology, the mobile router 210 establishes a link with an adjacent one of fixed FFDs 222, 224, and 226 of the second 6LoWPAN 202. Preferably, the link is established with the most adjacent fixed FFD. That is, when the mobile router 210 moves close to the FFD 222, it establishes a link with the FFD 222; when close to the FFD 224, a link with the FFD 224; and when close to the FFD 226, a link with the FFD 226. Once the mobile router 210 is connected to one of the FFDs 222, 224, and 226, it can access to the access router 230 via the 6LoWPAN coordinator 220, which acts as the gateway of the second 6LoWPAN 202. The nodes 221, 223, 225, and 227 are RFDs as the end devices of the first 6LoWPAN 201.

Once a link is established with an FFD of a 6LoWPAN, the mobile router performs a neighbor discovery process for searching for the gateway of the new 6LoWPAN. However, the neighbor discovery protocol is applied limitedly in the 6LoWPAN network environment. That is, when using the neighbor discovery protocol in the 6LoWPAN network environment, the length of a Router Advertisement (RA) message transmitted by the 6LoWPAN coordinator is extended from a second unit time duration to a minute unit time duration or the transmission of the RA message is omitted. However, such limited use of the neighbor discovery protocol makes the mobile or mobile router difficult to determine its location only with the RA messages. In this case, the mobile node or mobile router transmits a Router Solicitation (RS) message for soliciting the RA message. Such a neighbor discovery procedure is described in more detail with reference to FIG. 3.

Figure 3:
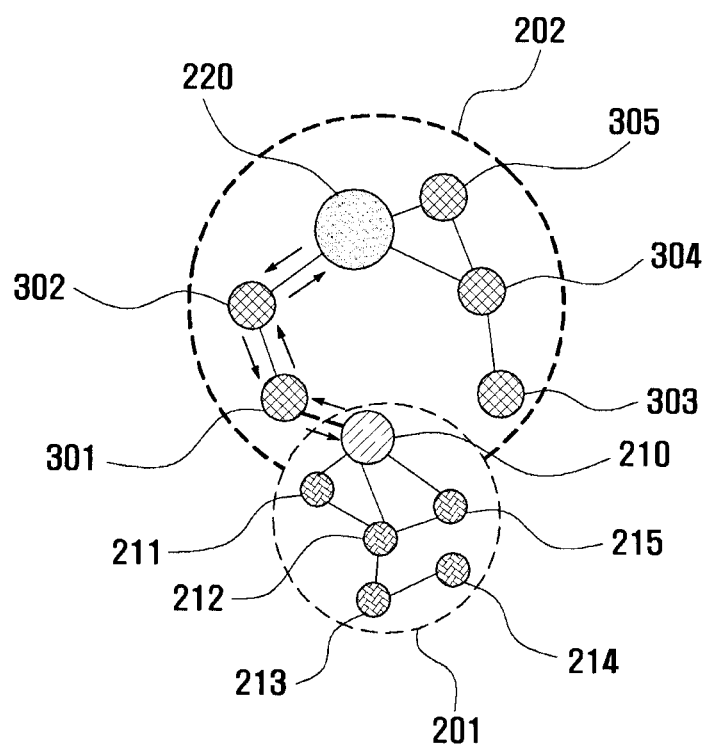
FIG. 3 is a diagram illustrating a neighbor discovery procedure in the network scenario of FIG. 2.

FIG. 3 is a diagram illustrating a neighbor discovery procedure in the network scenario of FIG. 2. In FIG. 3, the mobile router 210, which supports intra-network mobility of the first 6LoWPAN 201, enters the second 6LoWPAN 202 so as to establish a connection with an FFD 301. In order to simplify the explanation, the neighbor discovery procedure is described under the assumption that the mobile router 210 is a router supporting intra-network mobility in a 6LoWPAN (hereinafter called 6LoWPAN Head Router) in the following description. However, the mobile router 210 also can be a mobile node having no capability to managing the 6LoWPAN.

Referring to FIG. 3, the PAN coordinator 220 as a gateway of the second 6LoWPAN 202 is the sole PAN coordinator having unique PAN ID. The mobile router 210 obtains PAN ID information from a Media Access Control (MAC) layer message that was transmitted by an FFD 301 of the second 6LoWPAN 202 through its egress interface. Handoff of the mobile router 210 of the 6LoWPAN is carried out in the link layer. If detecting movement to the second 6LoWPAN 202, the mobile router 210 receives the PAN ID of the second 6LoWPAN 202 connected through its egress interface. The mobile router 210 obtains the PAN ID of the second 6LoWPAN 210 from the beacon messages transmitted by the FFD 301 in the MAC layer.

If the movement to the second 6LoWPAN 202 is detected with reference to the PAN ID, then the mobile router transmits an RS message for finding a gateway of the second 6LoWPAN 202. At this time, the RS message is transmitted with a coordinator's address as its destination address and is transmitted in a unicast manner. The RS message is sent with its address as the source address (SRC) and the address of the gateway 220, of the second 6LoWPAN 202, as the destination address (DST). The RS message is relayed to the gateway 220 of the second 6LoWPAN 202 by FFDs 301 and 302, in this illustrated embodiment. The mobile router 210 receives the RA message transmitted by the gateway 220 in response to the RS message via FFDs 302 and 301, respectively. The gateway 220 of the second 6LoWPAN 202 recognizes the entry of the mobile router 210 with reference to the RS message and replies with the RA message in response to the RS message. In this embodiment, the RA message is an extended RA message that includes a global IPv6 prefix of the second 6LoWPAN 202 and a 16-bit care-of address (CoA) indication. The RA message also includes the SRC field set to the address of the gateway 220 and the DST field set to the address of the mobile router 210. The global IPv6 prefix is a unique prefix for identifying the 6LoWPAN. The CoA is a 16-bit address that is temporarily assigned to the mobile router 210 as a node of the new 6LoWPAN. After completing exchange of the RA and RS messages, the gateway 220 of the second 6LoWPAN 202 knows that the mobile router 210 is connected to the second 6LoWPAN 202. The 16-bit CoA assigned by the gateway 220 is used in the second 6LoWPAN 202 and transmitted in the CoA option format as shown in table 1.

TABLE 1

| Type (8 bits) | Length (8 bits) | Care-of Address (16 bits) |
| --- | --- | --- |

As shown in table 1, the CoA option format includes an 8-bit Type field, an 8-bit Length field, and a 16-bit CoA field. The Type field contains information on the type of CoA, the Length field contains information the length of the CoA, and the CoA field contains 16-bit temporary information. Once the CoA is assigned, the packets destined to the previous address of the mobile router 210 forwards the CoA such that the mobile router 210 can receive the packets transmitted to its previous address (in the first 6LoWPAN) even when it is located in the second 6LoWPAN 202, thereby supporting global mobility to the first 6LoWPAN 201. Also, the mobile router 210 carrying the first 6LoWPAN 201 address can receive the packets destined to the nodes 211 to 215 of the first 6LoWPAN 210 and forward the packets to the destination nodes 211 to 215. This means that the mobile router 210 can support mobility to the end devices of the first 6LoWPAN 201 carried by the mobile router 210. Accordingly, when an end device moves in the same 6LoWPAN, i.e. when the link to a FFD is changed without changing the 6LoWPAN, the mobile router can support the mobility to the end devices of the 6LoWPAN without a binding procedure, such as the home registration procedure to inform a Home Agent (HA) of movement of the 6LoWPAN. Also, since there is no need to exchange signaling messages, such as the binding update message and binding acknowledge message, the mobility management system and method of the present invention can reduce the problems caused by signaling overhead.

Figure 4:
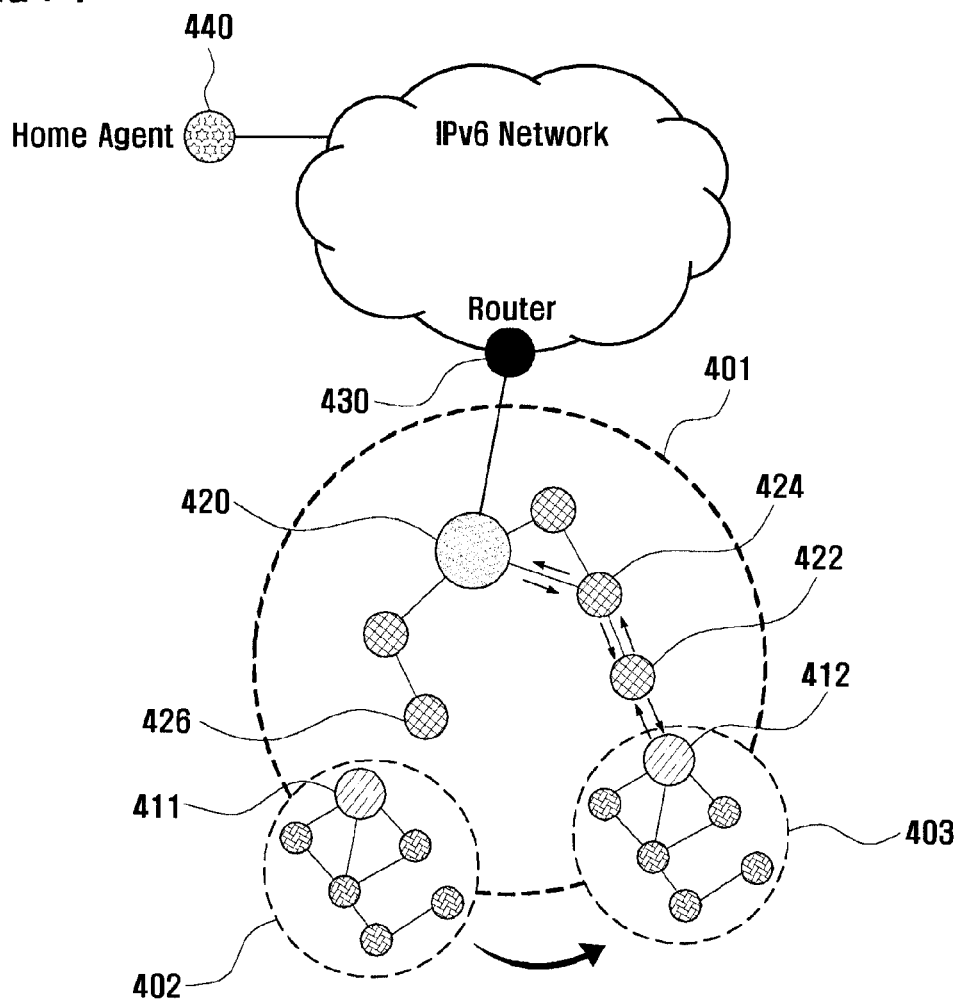
FIG. 4 is a diagram illustrating a scenario of intra-network mobility in which a mobile router moves within a 6LoWPAN according to an exemplary embodiment of the present invention.

FIG. 4 is a diagram illustrating a scenario of intra-network mobility according to an exemplary embodiment of the present invention in which a mobile router moves within a 6LoWPAN. FIG. 4 shows an exemplary scenario in which a mobile router 411(412) which supports mobility to a 6LoWPAN 402(403) and is connected to an FFD (router) 426 belonging to another 6LoWPAN 401 moves close to another FFD (router) 422 and connects to the FFD 422.

Figure 5:
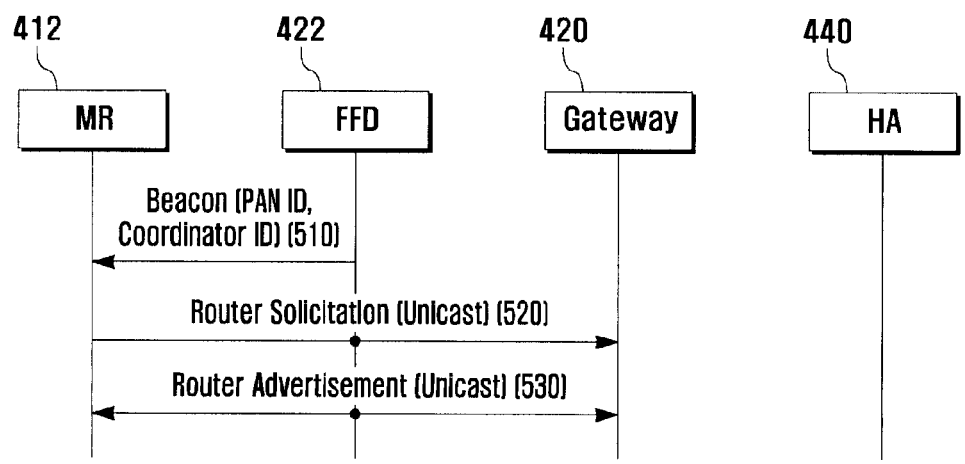
FIG. 5 is a message flow diagram illustrating message flows among network elements in the scenario of FIG. 4.

FIG. 5 is a message flow diagram illustrating message flows among network elements in the scenario of FIG. 4.

Referring to FIGS. 4 and 5, the mobile router 412 moves close to the router 422 receives a beacon message transmitted by the router 422 (S510). The mobile router 412 acquires PAN ID information through MAC layer communication with the router 422. The mobile router 412 compares the PAN ID obtained at step S510 with a previously stored PAN ID. If the two PAN IDs are identical, then the mobile router 412 determines that it remains in the same PAN. Otherwise, if the PAN IDs are different, the mobile router 412 determines that it has moved to another PAN. If it has been determined that the mobile router 412 moves within the same 6LoWPAN, the mobile router 412 performs the neighbor discovery procedure. That is, the mobile router 412 transmits RS message to a gateway 420 of the 6LoWPAN 401 via the routers 422 and 424 in a unicast manner (S520). The RS message is transmitted in the same format as described with reference to FIG. 3.

Upon receipt of the RS message, the gateway 420 transmits an RA message to the mobile router 412 via the routers 424 and 422 (S530). The RA message includes a CoA option, as described with reference to FIG. 3. Once the mobile router 412 is assigned the CoA, the packets destined to the previous address of the mobile router 412 are forwarded to the CoA. For example, a correspondent node of an external network (not shown) transmits a packet destined to the mobile router 411 having the previously assigned address after it has moved close to the router 422 and has been assigned the CoA, a HA 440 forwards the packet to the gateway 420 of the mobile router 411 via an access router 430. Herein the mobile router 411 and the mobile router 412 are the same mobile router in different positions. That is, the mobile router 411 moves to a new position and is represented by the mobile router 412 in order to distinguish between the mobile routers which locate at the different positions. Upon receipt of the packet destined for the mobile router 411, the gateway 420 of the 6LoWPAN 401 refers to the CoA assigned to the mobile router 412 and forwards the packet to the mobile router 412.

In the case of movement within the 6LoWPAN, the mobile router 412 [is this 411 or 412?] knows it's movement within the same 6LoWPAN 401 with reference to the PAN ID obtained at step S510 and transmits an RS message rather than performing a binding procedure. In the case that the mobile router moves within the same 6LoWPAN, the packet destined to the mobile router is forwarded to its CoA by the PAN coordinator (i.e. gateway) of the 6LoWPAN without performing a binding update procedure with the HA. Since the CoA is 16-bit address used in the 6LoWPAN is shorter than the 128-bit IPv6 address, there is a resulting reduction in packet size. Typically, when the mobile router moves to a link away from its home link, the mobile router performs a binding procedure in which the mobile router sends a binding update message to the HA and receives a binding acknowledgement message from the HA for establishing a bidirectional tunnel or link between the mobile router and its HA. After the binding procedure has been completed, all the packets transferred through the tunnel has an IP header including the address information of the HA and mobile router. In this case, since the IP header carries four 128-bit IPv6 addresses, at least 64 bytes of the IP header are allocated for the IP addresses. However, the IP header of which 64 bytes are allocated for IP addresses may cause various problems in the limited packet size 6LoWPAN. In this embodiment, when moving a mobile router within a 6LoWPAN, such problems caused by the limited packet size can be solved by using the 16-bit 6LoW-PAN address rather than the relatively long IPv6 address.

Until now, how to support mobility to the mobile router moving within the same 6LoWPAN has been described, however, mobile router may move to another 6LoWPAN. Supporting mobility between 6LoWPANs is described with reference to FIGS. 6 and 7.

Figure 6:
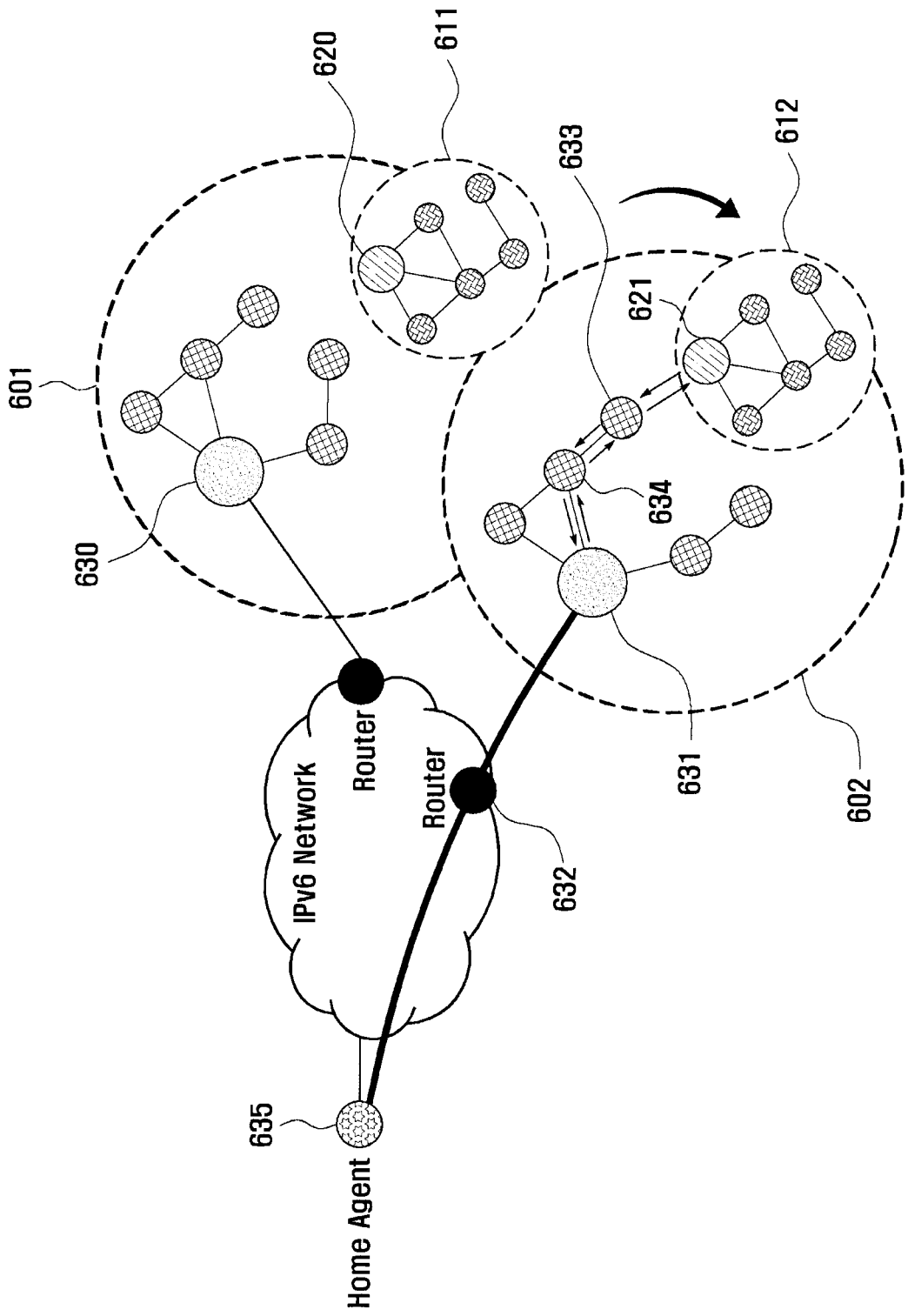
FIG. 6 is a diagram illustrating a scenario of inter-network mobility in which a mobile router moves between 6LoW-PANs according to an exemplary embodiment of the present invention.

FIG. 6 is a diagram illustrating a scenario of inter-network mobility in which a mobile router moves between 6LoW-PANs according to an exemplary embodiment of the present invention. In FIG. 6, it is assumed that the networks 601, 602, 611, and 612 are 6LoWPANs, the node(s) 620(621) is (are) a mobile router for supporting mobility to the 6LoWPAN 611 (612), and the mobile router 620 connected to a router of the 6LoWPAN 601 moves to another 6LoWPAN 602 and establishes a new connection with a router 633 of the new 6LoW-PAN 602. Herein the node 620 and the node 621 are the same node in different positions. That is, the node 620 moves to a new position of different 6LowPAN and is represented by the node 621 in order to distinguish between the nodes which locate at the different positions.

Figure 7:
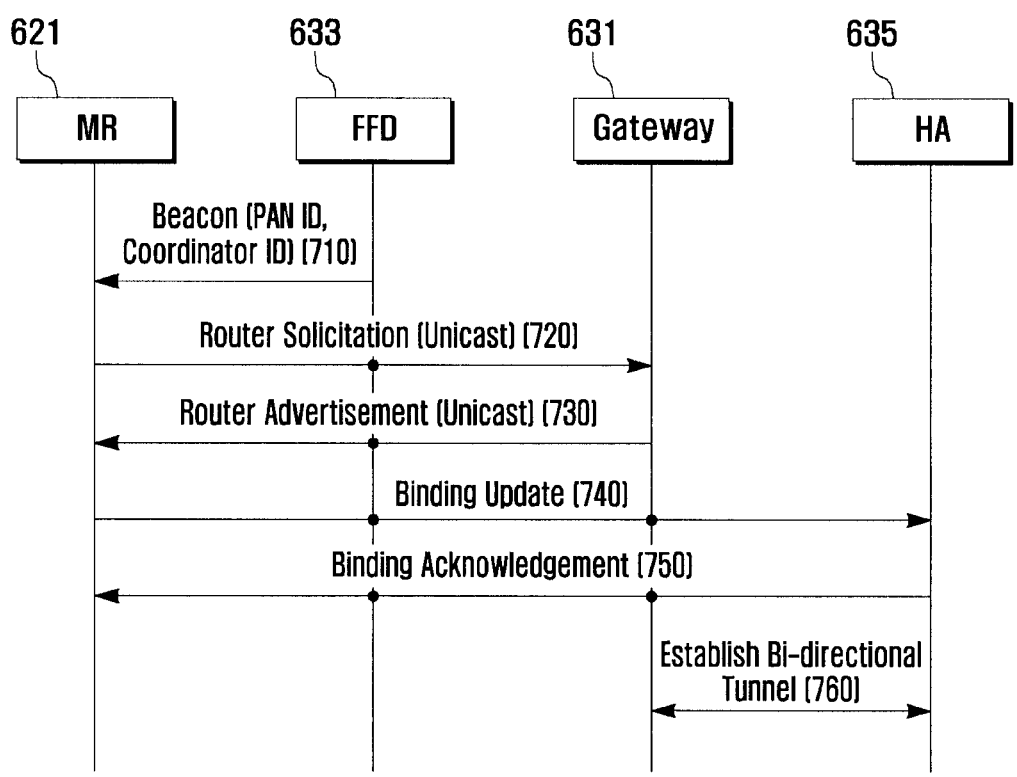
FIG. 7 is a message flow diagram illustrating message flows among network elements in the scenario of FIG. 6.

FIG. 7 is a message flow diagram illustrating message flows among network elements in the scenario of FIG. 6.

Referring to FIGS. 6 and 7, after moving from the 6LoW-PAN 601 to 6LoWPAN 602, the mobile router 621 receives a beacon message transmitted by the router 633 of the 6LoW-PAN 602 (S710). Herein the moving from the 6LoWPAN 601 to the 6LoWPAN 602 means that the mobile router 620 in the 6LoWPAN 601 also moves to the mobile router 621 in the 6LoWPAN 602. As aforementioned, the mobile router 621 is the mobile router after the mobile router 620 in the 6LoW-PAN 601 has moved to the 6LoWPAN 602. The beacon message contains a PAN ID of the 6LoWPAN 602. The mobile router 621 extracts the PAN ID from the beacon message and compares the current PAN ID with the previously stored PAN ID. If the two PAN IDs are identical, then the mobile router 621 determines that it has moved within the same 6LoWPAN. Otherwise, if the two PAN IDs are different, then the mobile router 621 determines that it has moved to another 6LoWPAN. If it is determined that the mobile router 621 moved from the first 6LoWPAN 601 to the second 6LoWPAN 602, then the mobile router 621 performs a binding procedure as well as neighbor discovery procedure. In this case, the mobile router 621 transmits an RS message to the gateway 631 of the second 6LoWPAN 602 via the relay routers 633 and 634 in a unicast manner (S720). At this time, the RS message is transmitted in the same format as described with reference to FIG. 3. Upon receipt of the RS message, the gateway 631 of the second 6LoWPAN 602 transmits an RA message to the mobile router 621 via the relay routers 634 and 633 in a unicast manner (S730) in response to the RS message. The RA message includes a CoA option as described with reference to FIG. 3. If the mobile router 621 has detected an inter-6LoWPAN movement, the mobile router 621 creates and transmits a Binding Update message having the SRC field set to CoA address of the mobile router 621 and the DST field set to address of the HA 635. The gateway 631 of the second 6LoWPAN 602 receives the Binding Update message and resets the SRC field to the address of the gateway 631 before forwarding the Binding Update message, such that the HA 635 receives the Binding Update message of which SRC field is set to a second 6LoWPAN address and DST field is set to the HA's address.

Upon receipt of the binding update message, the HA 635 records the home address and foreign network prefix (ingress prefix) of the mobile router 621 in a Binding Cache list. That is, the HA 635 updates the Binding Cache list with the CoA of the gateway 631 of the second 6LoWPAN 602 and the 6LoW-PAN prefix of the mobile router 621. After updating the Binding Cache list, the HA 635 creates and transmits a Binding Acknowledge message to the gateway 631 of the second 6LoWPAN 602 in response to the Binding Update message. Upon receipt of the Binding Acknowledge message, the gateway 631 of the second 6LoWPAN 602 forwards the Binding Acknowledge message to the mobile router 621 via the relay routers 634 and 633. After the binding procedure has completed, a bidirectional tunnel is established between the HA 635 and the gateway 631 (S760). Accordingly, the home registration procedure to the mobile router moved to another 6LoWPAN is completed with the HA 635. Here, since the CoA of the mobile router 621 registered with the HA 635 is the address of the gateway 631 of the second 6LoWPAN 602, the packets destined to the mobile router 621 are forwarded to the gateway 631 through the tunnel established between the HA 635 and the gateway 631. The packets received by the gateway 631 of the second 6LoWPAN 602 are, thus, delivered to the mobile router 621. As described above, the bidirectional tunnel is established only between the HA 635 and the gateway 631 of the second 6LoWPAN, the packets received by the mobile router 621 can be delivered to the end nodes using their original 16-bit addresses, thereby reducing signaling overhead of tunneling by adopting a lightweight NEMO protocol to the mobile router.

The operations of the mobile router, 6LoWPAN gateway, and HA for securing intra-6LoWPAN mobility and inter-6LoWPAN mobility are described in more detail.

Figure 8:
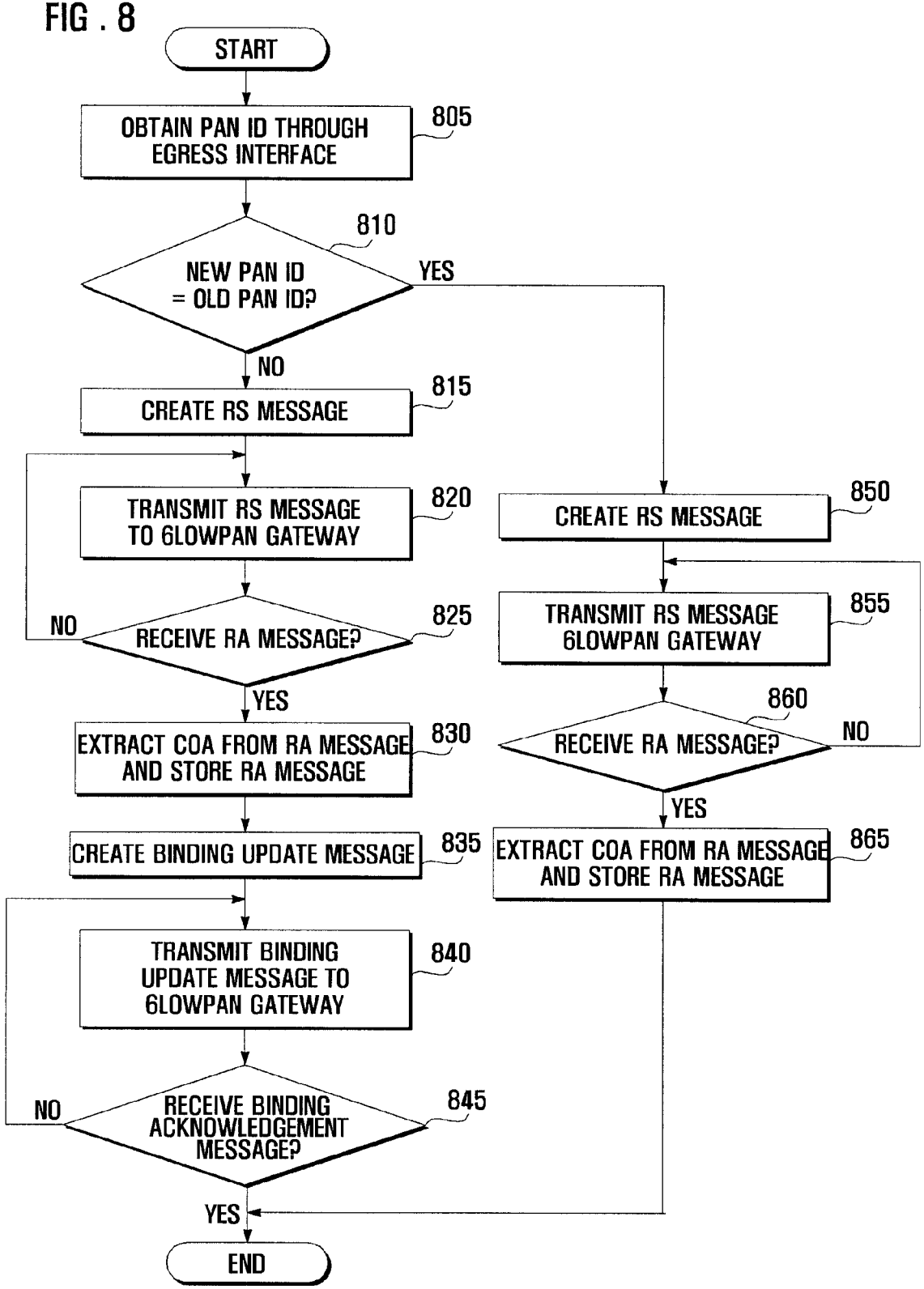
FIG. 8 is a flowchart illustrating a mobility management method in terms of a mobile router according to an exemplary embodiment of the present invention.

FIG. 8 is a flowchart illustrating a mobility management method in terms of a mobile router according to an exemplary embodiment of the present invention.

Referring to FIG. 8, the mobile router (412 in FIGS. 4 and 621 in FIG. 6) obtains a PAN ID from a beacon message transmitted by an FFD of a 6LoWPAN (S805). After obtaining the PAN ID, the mobile router determines whether the current PAN ID (hereinafter called new PAN ID) is identical with the previously stored PAN ID (hereinafter called old PAN ID) (S810). If the new PAN ID is identical with the old PAN ID, then the mobile router performs step S815 and, otherwise, performs step S850. If the new PAN ID is not identical with the old PAN ID, the mobile router determines the inter-6LoWPAN movement and performs a binding procedure as well as the neighbor discovery procedure. Accordingly the mobile router creates RS message (S815) for performing the neighbor discovery procedure and creates binding update message (S835) for performing the binding procedure. For the more precise explanation, we added this as below. The identification of the new and old PAN IDs being the same indicates an intra-6LoWPAN movement of the mobile router, and a difference between the new and old PAN IDs means an inter-6LoWPAN movement of the mobile router. That is, the intra-6LoWPAN movement is a movement within the same 6LoWPAN such that the mobile router changes the link between the FFDs of the same 6LoWPAN, and the inter-6LoWPAN movement is a movement across two different 6LoWPANs such that the mobile router changes the link between FDDS belonged to the different 6LoWPANs. If the mobile router determines the intra-6LoWPAN movement, the mobile router performs only neighbor discovery procedure without a binding procedure, and if the mobile router determines the inter-6LoWPAN movement, the mobile router performs the binding procedure as well as the neighbor discovery procedure.

At step S815, the mobile router generates an RS message for triggering neighbor discovery. The RS message includes a source address field set to the address of the mobile router and a destination address field set to the gateway of the 6LoWPAN to which the mobile router is attached. Next, the mobile router transmits the RS message to the gateway of the 6LoWPAN in a unicast manner (S820). After transmitting the RS message, the mobile router waits for receiving an RA message (S825). If an RA message is received within a predetermined time, then the mobile router performs step S830 and, otherwise, repeats step S820.

At step S830, the mobile router extracts a CoA from the RA message and stores the extract CoA. The CoA is used as an address for transmitting and receiving packets afterward. The mobile router may update routing information shared with neighbor nodes using the CoA. Next, the mobile router creates a binding update message for triggering the binding procedure with an HA (635 in FIG. 7) (S835). Here, the binding update message includes the source address field set to the CoA of the mobile router 621 and the destination address field set to the address of the HA. Next, the mobile router transmits the binding update message to the gateway of the 6LoWPAN (S840) and waits for receiving a binding acknowledgement message (S845). If a binding acknowledgement message is received in a predetermined time, then the mobile router ends the procedure. Otherwise, step S840 is repeated.

Returning to step 810, if the new PAN ID is identical with the old PAN ID, the mobile router determines the intra-6LoWPAN movement and performs a neighbor discovery procedure. Accordingly the mobile router just creates RS message (S850) for performing the neighbor discovery procedure without creating binding update message (as in step 835) for performing the binding procedure after the step 865. If the new PAN ID is not identical with the old PAN ID, the mobile router determines the inter-6LoWPAN movement and performs a binding procedure as well as the neighbor discovery procedure. Accordingly the mobile router creates RS message (S815) for performing the neighbor discovery procedure and creates binding update message (S835) for performing the binding procedure.] At step 810, if the new PAN ID is different from the old PAN ID, the mobile router generates an RS message for neighbor discovery (S850). Here, the RS message includes the source address field set to the address of the mobile router and the destination address field set to the address of the gateway of the 6LoWPAN to which the mobile router is attached. Next, the mobile router transmits the RS message to the gateway of the 6LoWPAN in a unicast manner (S855) and waits for receiving an RA message in response to the RS message (S860). At this time the RA message is an extended RA message including the CoA information assigned to the mobile router. If an RA message is received in a predetermined time, then the mobile router extracts the CoA from the RA message (S865) and processing is completed. Otherwise, step S855 is repeated The CoA is used for receiving and transmitting packets afterward.

Figure 9:
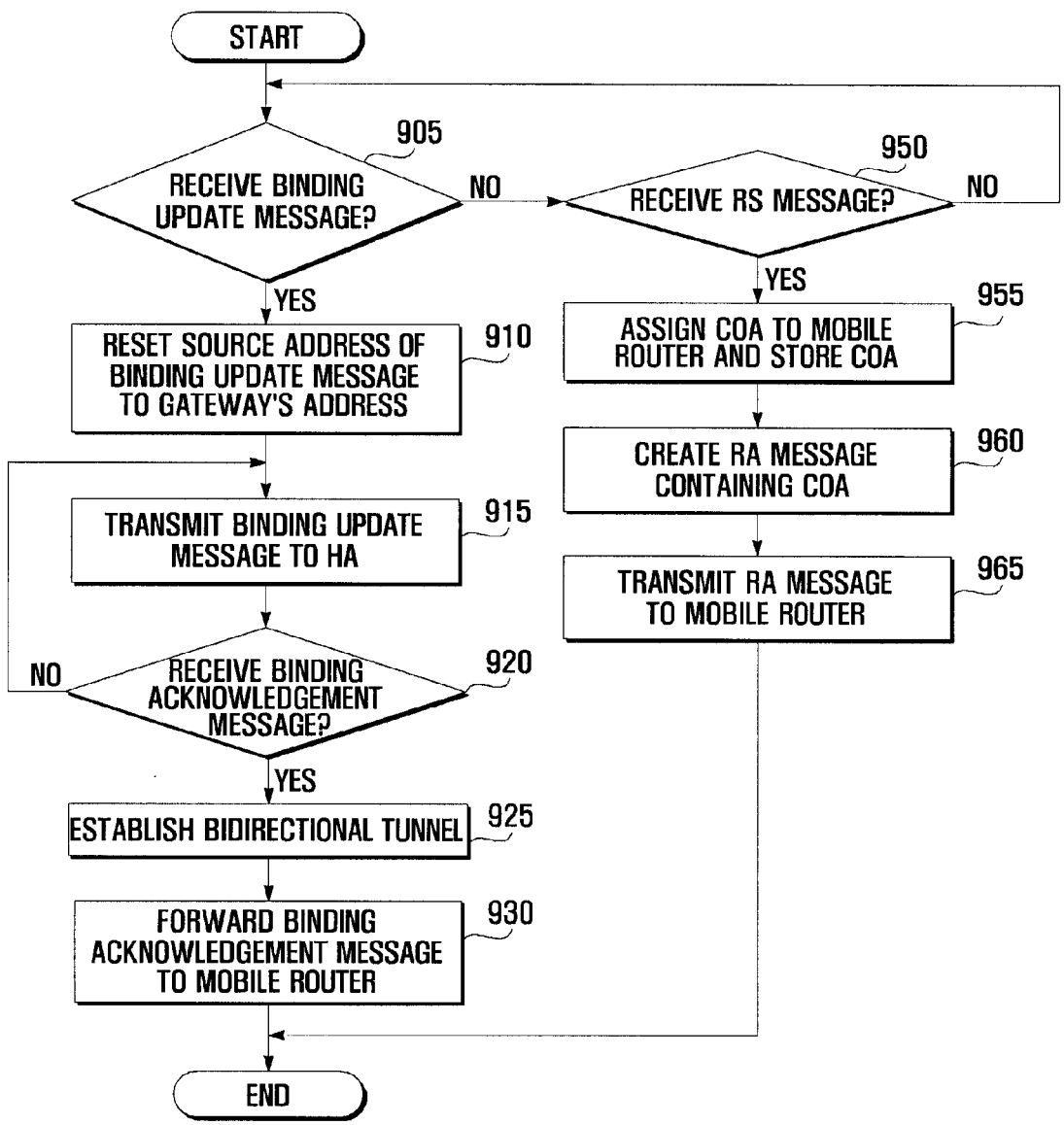
FIG. 9 is a flowchart illustrating a mobility management method in terms of a 6LoWPAN gateway according to an exemplary embodiment of the present invention.

FIG. 9 is a flowchart illustrating a mobility management method in terms of a 6LoWPAN gateway according to an exemplary embodiment of the present invention.

Referring to FIG. 9, the gateway (420 in FIGS. 5 and 631 in FIG. 7) of the 6LoWPAN monitors reception of a binding update message transmitted by the router (412 in FIGS. 5 and 621 in FIG. 7) (S905). If a binding message is received, then the gateway 631 performs step S910. Otherwise, step S950 is performed. At step S910, the gateway 631 resets the source field of the binding update message to its address. Although the source address is replaced, the address of the mobile router is carried in the home address option field of the binding update message. Next, the gateway 631 transmits the binding update message containing the reset source address to the HA 635 (see FIG. 7) and waits for receiving a binding acknowledgement message in response to the binding update message (S920). If a binding acknowledgement message is received within a predetermined time, the gateway 631 performs step S925. Otherwise, step S915 is repeated. At step S925, the gateway 631 establishes a bidirectional tunnel with the HA 635 and forwards the binding acknowledgement message to the mobile router 621 (S930).

Returning to step 905, at step S950, the gateway 631 determines whether an RS message is received. If an RS message is received, then the gateway 631 performs step S955. Otherwise, if the RS message is not received, the step S905 is repeated. The gateway 631 creates a CoA to be assigned to the mobile router 621, which transmitted the RS message, and stores the RS message within a storage unit (not shown) at step S955. After assigning the CoA to the mobile router 621, the gateway 631 receives a packet destined to the mobile router 621 and forwards the packet to the CoA but not the old address. Next, the gateway 631 generates an extended RA message including a CoA option field containing the CoA (S960) and transmits the extended RA message to the mobile router 621 (S965).

Figure 10:
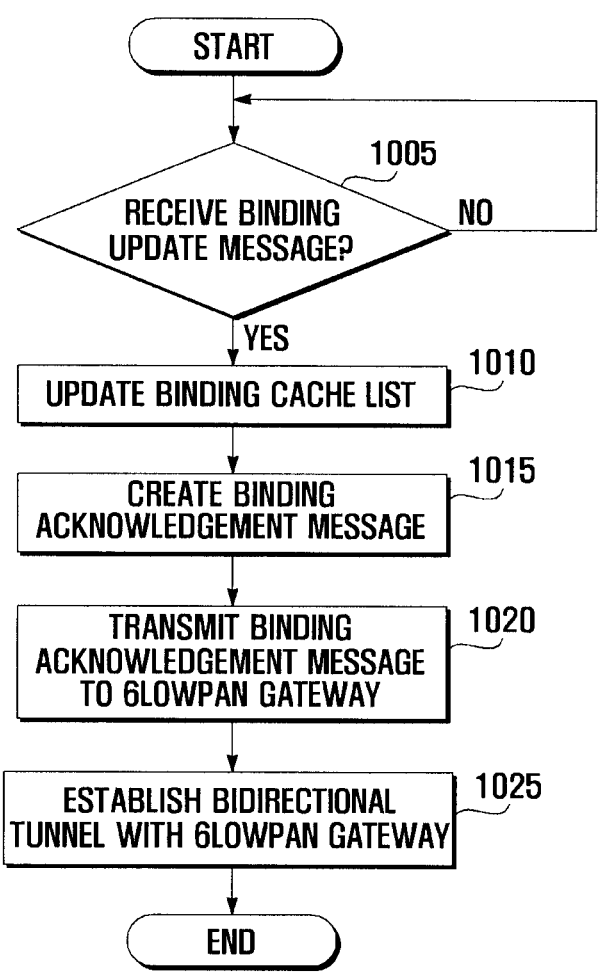
FIG. 10 is a flowchart illustrating a mobility management method in terms of an HA according to an exemplary embodiment of the present invention.

FIG. 10 is a flowchart illustrating a mobility management method in terms of an HA according to an exemplary embodiment of the present invention.

Referring to FIG. 10, the HA (440 in FIGS. 5 and 635 in FIG. 7) monitors reception of a binding update message (S1005). If a binding update message is received within a predetermined time, the HA 635 performs step S1010. Otherwise step S1005 is repeated. At step S1010, the HA 635 updates its binding cache list using the information carried by the binding update message. The binding cache list records the CoA of the gateway 631, the home address of the mobile router 621, and the mobile network prefix, and the information on the mobile router 621 is updated with reference to the binding update message transmitted by the mobile router 621. After updating the binding cache list, the HA 635 generates a binding acknowledgement message (S1015) and transmits the binding acknowledgement message to the gateway 631 (S1020). Next, the HA 635 establishes a bidirectional tunnel with the gateway 631 (S025). In this embodiment of the present invention, the bidirectional tunnel is established between the 6LoWPAN gateway and the HA rather than between the mobile router and the HA, whereby the gateway processes the IPv6 packet received through the tunnel into a packet having a 16-bit address such that the packet having the 16-bit address is delivered within the mobile network.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

With the above-described operations of the mobile router, 6LoWPAN gateway, and HA, the lightweight NEMO protocol can be applied to 6LoWPAN environment.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the mobility management system and method of the present invention allows a lightweight NEMO protocol to support mobility of 6LoWPAN in unit of network, thereby reducing signaling overhead and binding procedure latency. That is, in a case of inter-network movement, a bidirectional tunnel is established between a Home Agent and a gateway of a current network rather than between the Home Agent and a mobile router of the mobile 6LoWPAN which is a node of the current network, whereby the omission of tunneling reduces signaling overhead within the 6LoWPAN and mobility management problems caused by binding procedure. Meanwhile, in a case of intra-network movement, there is no need to establish a tunnel between the HA and a gateway of a current network to which a mobile router of a 6LoWPAN is attached, resulting in further reduction of signaling overhead and problems caused by binding procedure. Accordingly, the mobility management system and method of the present invention supports mobility to the 6LoWPAN in unit of network more efficiently than the conventional NEMO protocol. Furthermore, since the mobility management system and method of the present invention supports per-network mobility without additional power consumption of the nodes of the 6LoWPAN as well as the mobile router, thereby improving mobility management efficiency in 6LoWPAN environment.

What is claimed is:

1. A mobility management method, comprising:
   detecting, at a mobile terminal, movement of a mobile router supporting a mobility to a first personal area network (PAN) based on Internet Protocol version 6 (IPv6);
   determining whether the movement of the mobile router is an intra-network movement or an inter-network movement;
   transmitting, when the movement of the mobile router is the intra-network movement, an intra-network neighbor discovery request message to a gateway of a second PAN; and
   receiving an intra-network neighbor discovery response message containing a temporary address transmitted by the gateway of the second PAN in response to the intra-network neighbor discovery request message without creating and sending a subsequent binding update message to the gateway of the second PAN,
   wherein the intra-network movement of the mobile router is a change of a connection link from one node to another node, the nodes belonging to the second PAN.

2. The mobility management method of claim 1, wherein the first PAN is an IPv6 over lower power wireless PAN (6LoWPAN).

3. The mobility management method of claim 2, wherein the mobile router operates with a network mobility (NEMO) protocol supporting mobility to the 6LoWPAN network.

4. The mobility management method of claim 1, wherein the inter-network movement is a change of a connection link from a node of a network to a node of another network, the nodes of the network and the another network having routing functions.

5. The mobility management method of claim 4, further comprising receiving a PAN identifier (PAN ID) from the node of a current network.

6. The mobility management method of claim 5, wherein whether the movement is an intra-network movement or an inter-network movement is determined on the basis of the PAN ID.

7. The mobility management method of claim 1, wherein the intra-network neighbor discovery request message is a router solicitation message of which a source address is set to an address of the mobile router and a destination address is set to an address of a gateway of a currently attached network.

8. The mobility management method of claim 7, wherein the intra-network neighbor discovery response message is a router advertisement message of which the source address is set to the address of the gateway and the destination address is set to the address of the mobile router and further including a Care-of Address option and a global network prefix information.

9. The mobility management method of claim 8, wherein the Care-of Address option comprises an 8-bit Type field, an 8-bit Length field, and a 16-bit Care-of Address field.

10. The mobility management method of claim 1, further comprising:

transmitting, when the movement of the mobile router is an inter-network movement, an inter-network neighbor discovery request message followed by creating and transmitting a binding update message of which a source address is set to a temporary address to the gateway subsequent to receiving an inter-network neighbor discovery response message;

resetting, at the gateway, the source address of the binding update message to an address of the gateway;

transmitting the binding update message having the reset source address from the gateway to a home agent;

transmitting a binding acknowledgement message from the home agent to the gateway in response to the binding update message; and forwarding, at the gateway, the binding acknowledgement message to the mobile router.

11. The mobility management method of claim 10, further comprising recording, at the home agent, a changed address using the information contained in the binding update message for home registration.

12. The mobility management method of claim 10, further comprising establishing, when the gateway receives the binding acknowledgement message from the home agent, a bidirectional tunnel between the home agent and the gateway.

13. The mobility management method of claim 10, wherein a currently attached network uses 16-bit addresses for delivery of a packet within the network and IPv6 addresses for exchanging the packet with an external network.

14. A device for managing a mobility connection, comprising;

a processor in communication with a memory, the memory including code which when accessed by the processor causes the processor to:

detect movement of a mobile router supporting a mobility to a first personal area network (PAN) based on Internet Protocol version 6 (IPv6);

determine whether the movement of the mobile router is an intra-network movement or an inter-network movement;

transmit, when the movement is the intra-network movement, an intra-network neighbor discovery request message to a gateway of a second PAN; and receive an intra-network neighbor discovery response message containing a temporary address transmitted by the gateway of the second PAN in response to the intra-network neighbor discovery request message without creating and sending a subsequent binding update message to the gateway of the second PAN, wherein the intra-network movement of the mobile router is a change or a connection link from one node to another node, the nodes belonging to the second PAN.

15. The device of claim 14, wherein said code causes said processor to:

transmit, when the movement of the mobile router is an inter-network movement, an inter-network neighbor discovery request message followed by creating and transmitting a binding update message of which a source address is set to a temporary address to a gateway after receiving the inter-network neighbor discovery response message;

reset, at the gateway, the source address of the binding update message to an address of the gateway;

transmit the binding update message having the reset source address from the gateway to a home agent;

transmit a binding acknowledgement message from the home agent to the gateway in response to the binding update message; and forward, at the gateway, the binding acknowledgement message to the mobile router.

* * * * *

UNITED STATES PATENT AND TRADEMARK OFFICE
CERTIFICATE OF CORRECTION

PATENT NO.          : 8,797,944 B2                                       Page 1 of 1
APPLICATION NO.     : 12/354875
DATED               : August 5, 2014
INVENTOR(S)         : Hyo Hyun Choi et al.

It is certified that error appears in the above-identified patent and that said Letters Patent is hereby corrected as shown below:

In the Claims:

Column 13, Claim 14, Lines 29-31 should read as follows:
--...comprising: a processor in...--

Column 14, Claim 14, Line 14 should read as follows:
--...change of a connection...--

Signed and Sealed this
Twenty-first Day of October, 2014

Michelle K. Lee
*Deputy Director of the United States Patent and Trademark Office*